(12) United States Patent
Sato et al.

(10) Patent No.: US 8,821,091 B2
(45) Date of Patent: Sep. 2, 2014

(54) COMPONENT PART MOUNTING STRUCTURE

(75) Inventors: Takahiro Sato, Saitama (JP); Shogo Akaba, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 162 days.

(21) Appl. No.: 13/201,636

(22) PCT Filed: Jan. 14, 2010

(86) PCT No.: PCT/JP2010/000168
§ 371 (c)(1),
(2), (4) Date: Aug. 16, 2011

(87) PCT Pub. No.: WO2010/095345
PCT Pub. Date: Aug. 26, 2010

(65) Prior Publication Data
US 2011/0299955 A1    Dec. 8, 2011

(30) Foreign Application Priority Data

Feb. 18, 2009 (JP) ................................. 2009-035836

(51) Int. Cl.
| | |
|---|---|
| F16B 39/00 | (2006.01) |
| B23P 11/00 | (2006.01) |
| B60R 11/00 | (2006.01) |
| B60R 13/02 | (2006.01) |
| F16B 5/02 | (2006.01) |
| F16B 25/00 | (2006.01) |

(52) U.S. Cl.
CPC ................. *B60R 13/02* (2013.01); *B60R 11/00* (2013.01); *F16B 5/02* (2013.01); *B60R 2011/0052* (2013.01); *B60R 2013/0287* (2013.01); *F16B 25/00* (2013.01)

USPC ............ 411/103; 411/172; 411/427; 411/437

(58) Field of Classification Search
USPC ......... 411/103, 166, 172, 173, 105, 427, 437, 411/301; 296/146.7
See application file for complete search history.

(56) References Cited

U.S. PATENT DOCUMENTS 2,479,992 A * 8/1949 Woods .......................... 411/551
2,836,215 A * 5/1958 Rapata ............................ 411/15
(Continued)

FOREIGN PATENT DOCUMENTS

| EP | 0 430 022 A2 | 6/1991 |
|---|---|---|
| EP | 0 860 615 A1 | 8/1998 |

(Continued)

*Primary Examiner* — Victor Batson
*Assistant Examiner* — Caroline L Natirboff
(74) *Attorney, Agent, or Firm* — Carrier Blackman & Associates, P.C.; William D. Blackman; Joseph P. Carrier

(57) ABSTRACT

A component part mounting structure for mounting a cup holder base (2) on a front surface (1a) of a side lining (1) of a vehicle by using a self-tapping screw (3), wherein the side lining (1) comprises a base portion (15) projecting from a rear surface (1b) of the side lining (1) and defining a space (16) in cooperation with the rear surface (1b), and a boss portion (17) projecting from the base portion and defining a through hole (18) opening out toward the space (16), characterized by that the cup holder base (2) is provided with a fastening seat (6) abutting the front surface (1a) of the side lining (1), and the self-tapping screw (3) is configured to be passed through the fastening seat (6) and side lining (1) from the side of the cup holder base (2), and engaged by the through hole (18) of the boss portion (17) at a free end thereof.

14 Claims, 3 Drawing Sheets

(56) References Cited

U.S. PATENT DOCUMENTS

| | | | |
|---|---|---|---|
| 3,388,732 A * | 6/1968 | Holton | 411/167 |
| 3,455,362 A * | 7/1969 | Mohrman | 411/103 |
| 3,999,583 A * | 12/1976 | Nelson | 411/182 |
| 4,310,273 A * | 1/1982 | Kirrish | 411/338 |
| 4,589,809 A * | 5/1986 | Moore et al. | 411/166 |
| 4,657,296 A | 4/1987 | Nishii et al. | |
| 5,046,904 A * | 9/1991 | Malinow | 411/15 |
| 5,098,765 A * | 3/1992 | Bien | 428/134 |
| 5,176,482 A | 1/1993 | Reinl | |
| 5,529,370 A * | 6/1996 | Veit | 296/146.7 |
| 5,833,416 A * | 11/1998 | Cau | 411/55 |
| 6,092,858 A * | 7/2000 | Bolwell | 296/146.7 |
| 6,092,953 A | 7/2000 | Chaptal et al. | |
| 6,342,286 B1 * | 1/2002 | Hollingshead et al. | 428/120 |
| 6,409,249 B1 * | 6/2002 | Han | 296/146.7 |
| 7,223,458 B2 * | 5/2007 | Tango | 428/131 |
| 7,789,455 B2 * | 9/2010 | Hall et al. | 296/187.05 |
| 2007/0017159 A1 * | 1/2007 | Moore | 49/502 |
| 2008/0019084 A1 * | 1/2008 | Lee et al. | 361/679 |

FOREIGN PATENT DOCUMENTS

| | | |
|---|---|---|
| EP | 1 748 199 A1 | 1/2007 |
| JP | 6-321022 A | 11/1994 |
| JP | 7-295316 A | 11/1995 |
| JP | 2005-239049 A | 9/2005 |
| JP | 2007-161014 A | 6/2007 |

* cited by examiner

COMPONENT PART MOUNTING STRUCTURE

TECHNICAL FIELD

The present invention relates to a component part mounting structure for fastening an optional component part onto a surface of a vehicle upholstery member.

BACKGROUND OF THE INVENTION

Oftentimes, an optional component part such as a switch, a loudspeaker and a cup holder is required to be attached to an upholstery member such as a lining (trim) or an instrumental panel that defines an inner wall of a vehicle passenger compartment. Conventionally, when attaching an optional component part onto a lining, a part of the lining is cut out, and the optional component part is fitted into the cutout and fixedly secured therein (see patent document 1, for instance). It is also known to use self-tapping screws to directly secure the optional component part to the lining.

PRIOR ART REFERENCES

Patent Document(s)

Patent Document 1: JP 06-321022A

BRIEF SUMMARY OF THE INVENTION

Task to be Accomplished by the Invention

However, according to the method proposed in Patent Document 1, the lining has to be cut out before mounting the optional component part, and this requires extra working steps. The method involving the use of self-tapping screws impairs the external appearance because openings are required to be formed in the lining for tapping the screws thereinto, and have to be closed by caps or plugs when the intended optional component part is not used.

The present invention was made in view of such problems of the prior art, and has a primary object to provide a component part mounting structure that allows an optional component part to be attached to an upholstery member with a minimum amount of work, and does not impair the external appearance.

According to a first aspect of the present invention, such an object can be accomplished by providing a component part mounting structure for mounting a component part (cup holder base 2) on a front surface (1a) of a vehicle upholstery member (side lining 1) by using a fastening member (self-tapping screw 3), wherein the upholstery member comprises a base portion (15) projecting from a rear surface (1b) of the upholstery member and defining a space (16) in cooperation with the rear surface, and a boss portion (17) projecting from the base portion and defining a hole (18) opening out toward the space, characterized by that: the component part is provided with a fastening seat (6) abutting the front surface of the upholstery member, and the fastening member is configured to be passed through the fastening seat and upholstery member from the side of the component part, and engaged by the hole of the boss portion at a free end thereof.

Thereby, the upholstery member is not required to be formed with a through hole for securing the component part so that the external appearance can be improved. As a space is formed between the boss and the rear surface of the upholstery member, the alignment of the hole passed through the component part and upholstery member by the fastening member with respect to the hole formed in the boss can be confirmed so that the component part can be attached to the upholstery member in proper alignment without fail.

According to a second aspect of the present invention, in addition to the first aspect of the present invention, the front surface of the upholstery member is provided with a marking (groove 30) indicating a position for abutting the fastening seat.

Thereby, the component part can be properly positioned with respect to the upholstery member with ease.

According to a third aspect of the present invention, in addition to the first aspect of the present invention, the front surface of the upholstery member is provided with a recess (11) configured to receive the fastening seat therein.

Thereby, the component part can be properly positioned with respect to the upholstery member with ease and at high precision.

According to a fourth aspect of the present invention, in addition to any one of the first to third aspects of the present invention, a through hole (7) is passed through the fastening seat for receiving the fastening member therein.

Thereby, the fastening member can be properly positioned with ease.

According to a fifth aspect of the present invention, in addition to any one of the first to fourth aspects of the present invention, the fastening member comprises a self-tapping screw (3).

Thereby, the widely used self-tapping screws can be used for implementing the present invention.

A sixth aspect of the present invention provides a method for mounting a component part (cup holder base 2) on a front surface (1a) of a vehicle upholstery member (side lining 1) by using a self-tapping screw (3), wherein the upholstery member comprises a base portion (15) projecting from a rear surface (1b) of the upholstery member and defining a space (16) in cooperation with the rear surface, and a boss portion (15) projecting from the base portion and defining a hole (18) opening out toward the space, and the component part is provided with a fastening seat (6) abutting the front surface of the upholstery member and having a through hole (7) passed across the fastening seat, the method comprising the steps of: forming a hole in the upholstery member by passing the self-tapping screw from the side of the component part through the through hole of the fastening seat and into the upholstery member; removing the self-tapping screw from the component part and upholstery member, and inspecting if axial centers of the through hole of the component part and the hole of the boss portion align with each other; if the two axial centers of the through hole of the component part and the hole of the boss portion do not align with each other, adjusting the position of the component part with respect to the upholstery member so as to align the two axial centers of the through hole of the component part and the hole of the boss portion with each other; and threading the self-tapping screw through the through hole of the component part and into the hole of the boss portion with the two axial centers of the through hole of the component part and the hole of the boss portion aligned with each other.

According to this method, after drilling the through hole in the upholstery member by using the self-tapping screw, it can be inspected if axial centers of the through hole of the component part and the hole of the boss portion align with each other. If the axial centers do not align with each other, the position of the component part with respect to the upholstery member can be finely adjusted so that the proper alignment may be achieved.

Effect of the Invention

Thus, the present invention provides a component mounting structure that can be assembled in a highly efficient manner and does not impair the aesthetic appearance.

DETAILED DESCRIPTION OF THE PREFERRED EMBODIMENTS

Figure 1:
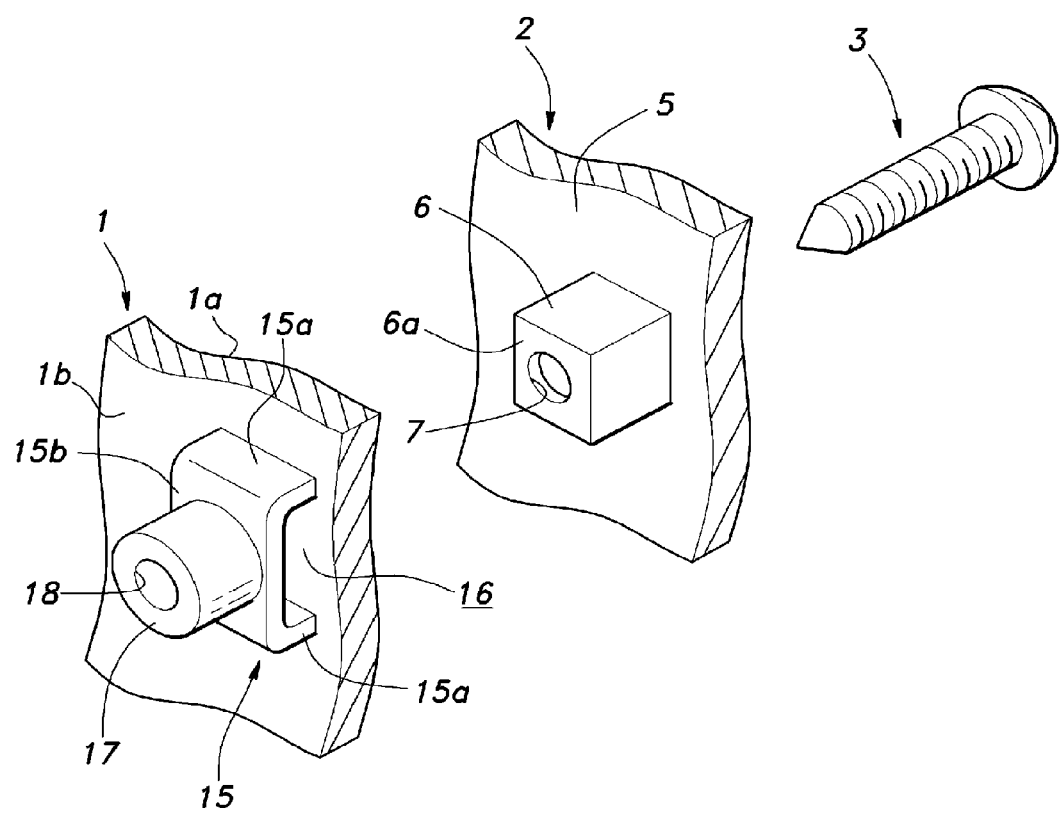
FIG. 1 is an exploded perspective view showing a component part mounting structure embodying the present invention.

An embodiment of the present invention applied to a mounting structure for mounting cup holder base 2 to a side lining 1 forming an inner wall of a passenger compartment of a motor vehicle is described in the following with reference to the appended drawings. FIG. 1 is an exploded perspective view showing the component part mounting structure embodying the present invention.

Referring to FIG. 1, a cup holder base (component part) 2 for supporting a cup holder (not shown in the drawing) is secured to a side lining (upholstery member) 1 by using a self-tapping screw (fastening member) 3. The side lining 1 forms a side wall of a vehicle passenger compartment, and is fixedly secured to a vehicle panel (not shown in the drawings). In the illustrated embodiment, the surface of the side lining 1 facing the interior of the passenger compartment is named as front surface 1a and the surface thereof facing the vehicle body panel is named as rear surface 1b.

The cup holder base 2 may comprise a base plate 5 for engaging a cylindrical cup holder and a fastening seat 6 protruding from the base plate 5. The fastening seat 6 includes a protruding end 6a defining a rectangular planar end surface configured to abut the front surface 1a of the side lining 1, and centrally formed with a through hole 7 for receiving the self-tapping screw 3 as will be described hereinafter.

A position on the side lining 1 is designated for mounting the cup holder base 2 thereof, and the front surface 1a at this position is formed with a recess 11 configured to snugly receive the protruding end 6a (see FIG. 2). The recess 11 provides a first example of an alignment guide structure provided on the side lining 1 for facilitating alignment of the cup holder base 2. This recess 11 is designed to allow the fastening seat 6 to be properly positioned with respect to the side lining 1, and may be a shallow one having a depth in the order of 0.5 mm.

A base portion 15 projects from the rear surface 1b of the side lining 1 at the position corresponding to the recess 11. The base portion 15 comprises a pair of side walls 15a, perpendicularly extending from the rear surface 1b of the side lining 1 and a planar plate 15b connecting the free ends of the two side walls 15a so as to present a shape of rectangular letter-C or a gate as viewed in a side view thereof, and as illustrated in FIGS. 2a-2d. A space 16 is defined jointly by the two side walls 15a and planar plate 15b of the base portion 15, and the rear surface 1b of the side lining 1.

A cylindrical boss portion 17 extends from the side of the planar plate 15b facing away from the space 16. The planar plate 15b is centrally provided with a through hole 18 that passes through the planar plate 15b and opens out to the space 16. The through hole 18 is placed such that the central axial line of the through hole 18 is perpendicular to the rear surface 1b of the side lining 1, and aligns with the central axial line of the through hole 7 of the cup holder base 7 when the fastening seat 6 is received in the recess 11. The through hole 18 may not be a through hole, but may be closed at the end thereof remote from the end opening out to the space 16. The side lining 1, base portion 15 and boss portion 17 may be integrally formed with plastic material.

Figure 2A:
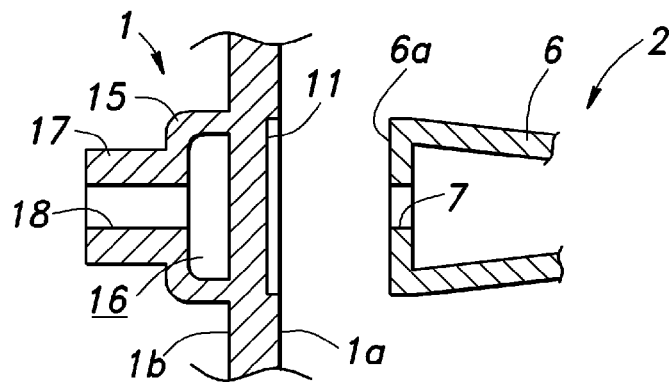
FIGS. 2a-2d are a set of diagrams illustrating the procedure of mounting a cup holder base to a side lining according to the embodiment of the component mounting structure of the present invention.

The process of mounting the cup holder base 2 to the side lining 1 is described in the following with reference to FIG. 2. FIG. 2 is a set of diagrams illustrating the procedure of mounting the cup holder base 2 to the side lining 1 according to the embodiment of the component mounting structure of the present invention. As shown in FIG. 2(a), first of all, the assembly worker places the fastening seat 6 onto the designated position of the front surface 1a of the side lining 1 by using the recess 11 formed in the front surface 1a of the side lining 1 as a guide.

Figure 2B:
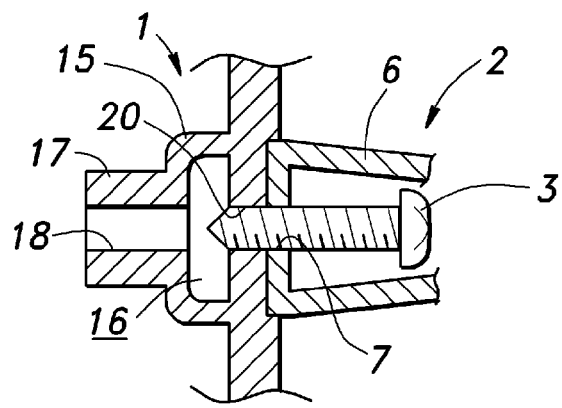

As shown in FIG. 2(b), the assembly worker fits the fastening seat 6 into the recess 11 to properly position the cup holder base 2 with respect to the side lining 1, and threads the self-tapping screw 3 into the through hole 7 of the cup holder base 2. A this time, the self-tapping screw 3 is caused to drill into the side lining 1 at the part corresponding to the through hole 7 until the free end of the self-tapping screw 3 penetrates the side lining 1 and reaches the space 16. Thereby, a through hole 20 is formed in the side lining 1.

Figure 2C:
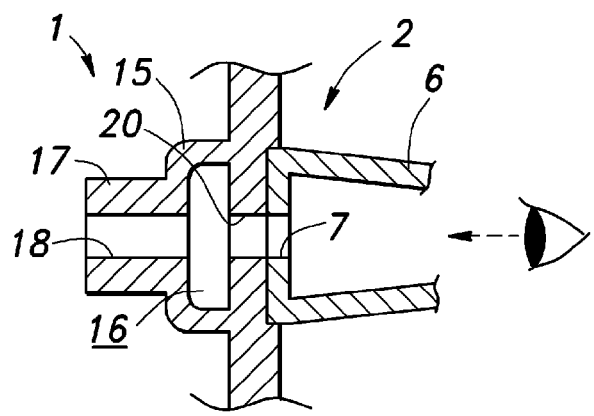

Then, as shown in FIG. 2(c), the assembly worker backs up and removes the self-tapping screw 3, and visually inspects from the side of the cup holder base 2 if the axial centers of the through hole 7 of the cup holder base 2 and the through hole 18 of the boss portion 17 agree with each other. When the fastening seat 6 of the cup holder base 2 is properly positioned by the recess 11 as is the case in the illustrated embodiment, the step of inspecting if the axial centers of the through hole 7 of the cup holder base 2 and the through hole 18 of the boss portion 17 agree with each other may be omitted.

Figure 2D:
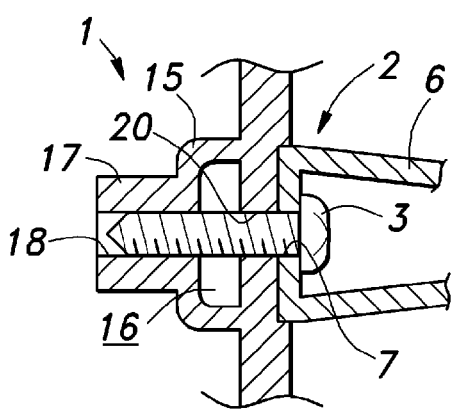

Upon visually ascertaining that the axial centers of the through hole 7 of the cup holder base 2 and the through hole 18 of the boss portion 17 agree with each other, the self-tapping screw 3 is once again threaded into the through hole 7 and the through hole 20 from the side of the cup holder base 3 as shown in FIG. 2(d). In this case, the self-tapping screw 3 is fully threaded into the hole so that the free end of the self-tapping screw 3 is threaded with the through hole 18 of the boss portion 17.

In the illustrated embodiment, as the recess 11 for snugly receiving the fastening seat 6 is provided in the front surface la of the side lining 1, the positioning of the cup holder base 2 with respect to the side lining 1 can be achieved both easily and accurately. As the front surface 1a of the side lining 1 is initially not formed with a hole for receiving the self-tapping screw 3, the external appearance of the side lining 1 is not impaired, and therefore, no plug or cap for concealing such a hole is required.

As the space 16 is defined between the boss portion 17 and the rear surface 1b of the side lining 1, it can be visually verified if the axial center lines of the through hole 7 of the cup holder base 2 and the through hole 18 of the boss portion 17 for receiving the self-tapping screw 3 agree with each other or not. If the central axial lines of the two through holes do not agree with each other, the cup holder base 2 can be put to the correct position simply by finely adjusting the mounting position of the cup holder base 2 on the side lining 1.

When drilling the through hole 20 in the side lining 1 by using the self-tapping screw 3, as the boss portion 17 is spaced apart from the side lining 1 by the space 16, the boss portion 17 is prevented from coming into contact with the self-tapping screw 3 as the self-tapping screw 3 is threaded into the through hole 20. Therefore, it can be avoided that an unnecessary hole which is offset from the through hole 18 be formed in the boss portion 17. If the hole is formed in the boss portion 17 in a partly overlapping relation with the through hole 18, a strong connection between the self-tapping screw 3 and boss portion 17 cannot be achieved.

A modified embodiment of the present invention is described in the following with reference to FIG. 3. FIG. 3 is a set of diagrams illustrating the procedure of a mounting cup holder base 2 to a side lining 1 by using a modified embodiment of the component mounting structure of the present invention. The modified embodiment differs from the previous embodiment in that a groove 30 is formed or a marking is made on the front surface 1a of the side lining 1, instead of the recess 11, to indicate the position at which the projecting end 6a of the fastening seat 6 should abut. The groove 30 or marking provides an additional example of an alignment guide structure which may be provided on the side lining 1 for facilitating alignment of the cup holder base 2. The modified embodiment is otherwise similar to the previous embodiment, and the parts of the modified embodiment corresponding to those of the previous embodiment are denoted with like numerals without repeating the description of such parts.

The groove 30 is formed on the front surface 1a of the side lining 1 so as to conform to the profile of the projecting end 6a of the fastening seat 6. The groove 30 may extend either continuously or discontinuously so as to delineate the profile of the projecting end 6a.

Figure 3A:
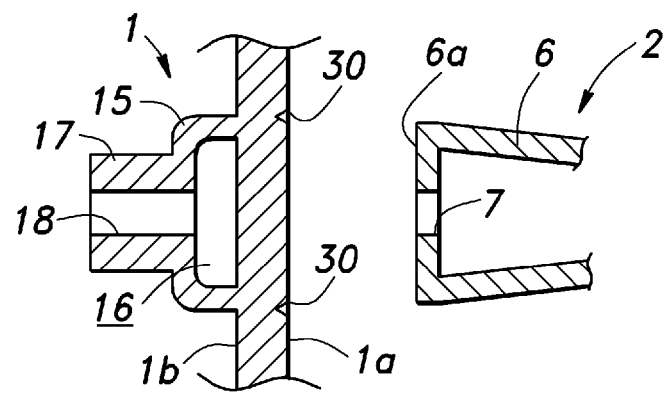
FIGS. 3a-3d are a set of diagrams illustrating the procedure of mounting cup holder base to a side lining according to a modified embodiment of the component mounting structure of the present invention

The process of mounting the cup holder base 2 to the side lining 1 is described in the following with reference to FIG. 3. As shown in FIG. 3(a), first of all, the assembly worker places the fastening seat 6 onto the designated position of the front surface 1a of the side lining 1 by using the groove 30 formed in the front surface 1a of the side lining 1 as a guide.

Figure 3B:
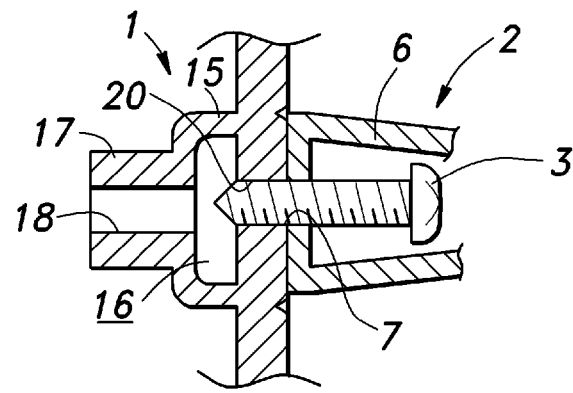

As shown in FIG. 3(b), the assembly worker abuts the fastening seat 6 onto the front surface 1a of the side lining 1 such that the projecting end 6a of the fastening seat 6 of the cup holder base 2 registers with the groove 30, and threads the self-tapping screw 3 into the through hole 7 of the cup holder base 2. A this time, the self-tapping screw 3 is caused to drill a hole in the side lining 1 at the part corresponding to the through hole 7 until the free end of the self-tapping screw 3 penetrates the side lining 1 and reaches the space 16.

Figure 3C:
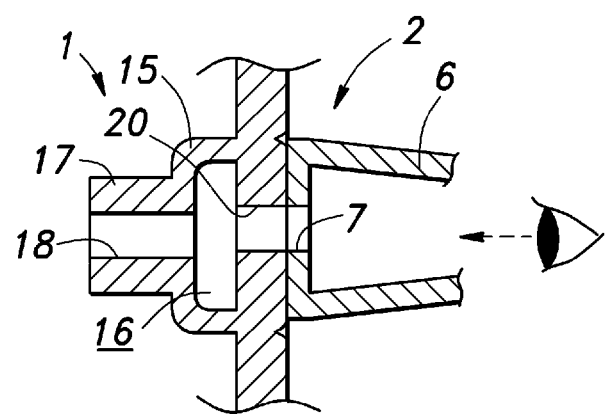
Figure 3D:
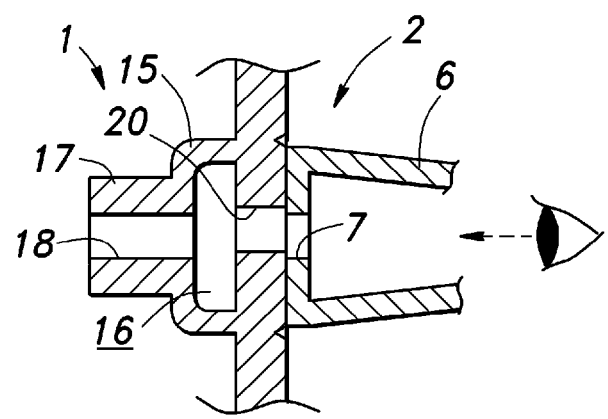

Then, as shown in FIG. 3(c), the assembly worker backs up and removes the self-tapping screw 3, and visually inspects from the side of the cup holder base 2 if the axial centers of the through hole 7 of the cup holder base 2 and the through hole 18 of the boss portion 17 agree with each other. When the axial centers of the through hole 7 of the cup holder base 2 and the through hole 18 of the boss portion 17 are offset from each other as shown in FIG. 3(d), the assembly worker finely adjusts the position of the cup holder base 2 with respect to the side lining 1 so that the axial centers of the two through holes 7 and 18 agree with each other as shown in FIG. 3(c).

Upon visually ascertaining that the axial centers of the through hole 7 of the cup holder base 2 and the through hole 18 of the boss portion 17 agree with each other, the self-tapping screw 3 is once again threaded through the through hole 7 and is caused to form a through hole 20 anew in the side lining 1 at the position corresponding to the through hole 7.

The assembly worker then fully threads the self-tapping screw 3 into the hole so that the free end of the self-tapping screw 3 is threaded with the through hole 18 of the boss portion 17.

The modified embodiment further improves the aesthetic appearance of the side lining 1 by eliminating the need for forming a recess 11 on the front surface 1a of the side lining 1.

Although the present invention has been described in terms of preferred embodiments thereof, it is obvious to a person skilled in the art that various alterations and modifications are possible without departing from the scope of the present invention which is set forth in the appended claims. For instance, the upholstery member to which the present invention may be applied is not limited to the side lining 1, but may consist of a instrument panel, a door lining (door trim), a dashboard panel or a seat back panel. Also, the component part to which the present invention may be applied is not limited to the cup holder base 2 but may consist of a switch base, a convenience hook or a monitor base for an onboard television set. The shape of the base portion of the illustrated embodiments is only exemplary, and a plurality of members may extend radially from the boss portion.

GLOSSARY 1 side lining (upholstery member)
1a front surface
1b rear surface
2 cup holder base (component part)
3 self-tapping screw (fastening member)
6 fastening seat
7 through hole
11 recess
15 base portion
16 space
17 boss portion
18 through hole (hole)
30 groove

The invention claimed is:

1. A component part mounting structure comprising:
A component part;
A vehicle upholstery member; and
A fastening member for mounting the component part on a front surface of the vehicle upholstery member;
Wherein the upholstery member comprises a base portion projecting from a rear surface portion of the upholstery member and defining a space in cooperation with the rear surface portion, the base portion being substantially C-shaped as viewed from a side thereof, a boss portion projecting from the base portion and defining a hole opening toward the space, and the space configured to allow visual verification that axial centers of a through hole of the component part and the hole of the boss portion align with each other;
Wherein the upholstery member, including the rear surface portion, the base portion and the boss portion is integrally formed from plastic material;
Wherein the boss portion and the rear surface portion of the upholstery member are spaced apart from each other by said space in a direction of passing of the fastening member when assembled; and
Wherein the component part is provided with a fastening seat for abutting the front surface of the upholstery member, and the fastening member is configured to be passed through the fastening seat and through the rear surface portion of the upholstery member from the side of the component part, and engaged by an inner surface of the hole of the boss portion at a free end thereof.

2. The component part mounting structure according to claim 1, wherein the front surface of the upholstery member is provided with a marking indicating a position for abutting the fastening seat.

3. The component part mounting structure according to claim 1, wherein the front surface of the upholstery member is provided with a recess configured to receive a portion of the fastening seat therein.

4. The component part mounting structure according to claim 1, wherein a through hole is passed through the fastening seat for receiving the fastening member therein.

5. The component part mounting structure according to claim 1, wherein the fastening member comprises a self-tapping screw.

6. A component part mounting structure comprising:
A component part;
A vehicle upholstery member and a vehicle upholstery member attachment structure; and
A fastening member for mounting the component part on a front surface of the vehicle upholstery member;
Wherein the upholstery member attachment structure comprises a base portion projecting from a rear surface portion of the upholstery member and defining a space in cooperation with the rear surface portion, the base portion being substantially C-shaped as viewed from a side thereof, a boss portion projecting from the base portion and defining a hole opening toward the space, and the space configured to allow visual verification that axial centers of a through hole of the component part and the hole of the boss portion align with each other;
Wherein the upholstery member, including the rear surface portion, the base portion and the boss portion is integrally formed from plastic material, and the upholstery member has an alignment guide structure formed on the front surface thereof to facilitate alignment of the component part with the upholstery member attachment structure;
Wherein the boss portion and the rear surface portion of the upholstery member are spaced apart from each other by said space in a direction of passing of the fastening member when assembled; and
Wherein the component part is provided with a fastening seat for abutting the front surface of the upholstery member, and the fastening member is configured to be passed through the fastening seat and through the rear surface portion of the upholstery member from the side of the component part, and engaged by an inner surface of the hole of the boss portion at a distal end thereof.

7. A component part mounting structure comprising:
A component part;
A vehicle door lining and vehicle door lining attachment structure; and
A threaded fastening member for mounting the component part on a front surface of the vehicle door lining;
Wherein the vehicle door lining attachment structure comprises a base portion projecting from a rear surface portion of the vehicle door lining and defining a space in cooperation with the rear surface portion, the base portion being substantially C-shaped as viewed from a side thereof, a boss portion projecting from the base portion and defining a hole opening toward the space, and the space configured to allow visual verification that axial centers of a through hole of the component part and the hole of the boss portion align with each other;
Wherein the vehicle door lining, including the rear surface portion, the base portion and the boss portion is integrally formed from plastic material, and the vehicle door lining has an alignment guide structure formed on the front surface thereof to facilitate alignment of the component part with the vehicle door lining attachment structure;
Wherein the boss portion and the rear surface portion of the vehicle door lining are spaced apart from each other by said space in a direction of passing of the threaded fastening member when assembled; and
Wherein the component part is provided with a fastening seat for abutting the front surface of the vehicle door lining, the fastening seat having a through hole formed therethrough, and the threaded fastening member is configured to be passed through the through hole of the fastening seat and through the rear surface portion of the vehicle door lining from the side of the component part, and engaged by an inner surface of the hole of the boss portion at a distal end of the threaded fastening member.

8. The component part mounting structure of claim 1, wherein:
the component part comprises a base plate and the fastening seat integrally attached to a rear side of the base plate; and
the fastening seat of the component part has a hollow chamber formed therein for receiving a head of the fastening member therein, such that the fastening member is spaced away from the base plate of the component part in an installed configuration thereof.

9. The component part mounting structure of claim 6, wherein:
the component part comprises a base plate and the fastening seat integrally attached to a rear side of the base plate; and
the fastening seat of the component part has a hollow chamber formed therein for receiving a head of the fastening member therein, such that the fastening member is spaced away from the base plate of the component part in an installed configuration thereof.

10. The component part mounting structure of claim 7, wherein:
the component part comprises a base plate and the fastening seat integrally attached to a rear side of the base plate; and
the fastening seat of the component part has a hollow chamber formed therein for receiving a head of the fastening member therein, such that the fastening member is spaced away from the base plate of the component part in an installed configuration thereof.

11. The component part mounting structure according to claim 6, wherein the alignment guide structure of the upholstery member comprises a marking indicating a position for abutting the fastening seat.

12. The component part mounting structure according to claim 6, wherein the alignment guide structure of the upholstery member comprises a recess configured to receive part of the fastening seat therein.

13. The component part mounting structure according to claim 7, wherein the alignment guide structure of the door lining comprises a marking indicating a position for abutting the fastening seat.

14. The component part mounting structure according to claim 7, wherein the alignment guide structure of the door lining comprises a recess configured to receive part of the fastening seat therein.

* * * * *